US012786618B2

(12) United States Patent
Li et al.

(10) Patent No.: US 12,786,618 B2
(45) Date of Patent: Nov. 3, 2026

(54) ROTARY MULTIFUNCTIONAL SPEAKER AND VEHICLE INCLUDING THE SAME

(71) Applicants: Hyundai Motor Company, Seoul (KR); Kia Corporation, Seoul (KR)

(72) Inventors: Zhe Li, Yantai (CN); Xiao He, Yantai (CN); Yan Xiang Huang, Yantai (CN); In Sik Chun, Seongnam-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 334 days.

(21) Appl. No.: 18/387,802

(22) Filed: Nov. 7, 2023

(65) Prior Publication Data

US 2024/0214723 A1 Jun. 27, 2024

(30) Foreign Application Priority Data

Dec. 26, 2022 (CN) ......................... 202211673992.5

(51) Int. Cl.
*H04R 1/32* (2006.01)
*B60H 3/00* (2006.01)
(Continued)

(52) U.S. Cl.
CPC ........... *H04R 1/323* (2013.01); *B60H 3/0014* (2013.01); *B60Q 3/70* (2017.02); *B60Q 3/80* (2017.02);
(Continued)

(58) Field of Classification Search
CPC ........ H04R 1/323; H04R 1/025; H04R 1/026; H04R 3/00; H04R 2201/025;
(Continued)

(56) References Cited

U.S. PATENT DOCUMENTS 11,297,405 B1 * 4/2022 Iniguez .................. H04R 1/028
11,555,591 B1 * 1/2023 Zheng ..................... F21V 5/046
(Continued)

FOREIGN PATENT DOCUMENTS

| | | | | | |
|---|---|---|---|---|---|
| CN | 112550141 A | | 3/2021 | |
| CN | 212796725 U | * | 3/2021 | |
| CN | 214591850 U | | 11/2021 | |
| FR | 3017189 A1 | * | 8/2015 | B60Q 1/0041 |
| JP | WO2009078338 A1 | * | 4/2011 | B60Q 3/80 |
| KR | 19980035472 U | * | 9/1998 | H04R 1/345 |

*Primary Examiner* — Anne Marie Antonucci
(74) *Attorney, Agent, or Firm* — MORGAN, LEWIS & BOCKIUS LLP

(57) ABSTRACT

A rotary multifunctional speaker and a vehicle includes: a mounting plate; a speaker assembly including a first hemispherical housing and a speaker mounted in the first hemispherical housing; a mood light assembly including a second hemispherical housing and a light source mounted in the second hemispherical housing; and a driving assembly provided on the mounting plate, electrically connected to an in-vehicle computer, and controlled by the in-vehicle computer, in which the speaker is electrically connected to the in-vehicle computer, the light source is electrically connected to the in-vehicle computer, the first and second hemispherical housings form a spherical housing and are mounted on the mounting plate, and the driving assembly coupled to the spherical housing rotates the spherical housing relative to the mounting plate according to control performed by the in-vehicle computer to make one of the mood light assembly and the speaker assembly face the interior of the vehicle.

18 Claims, 17 Drawing Sheets

(51) Int. Cl.

| | |
|---|---|
| ***B60Q 3/70*** | (2017.01) |
| ***B60Q 3/80*** | (2017.01) |
| ***B60R 16/023*** | (2006.01) |
| ***H04R 1/02*** | (2006.01) |
| ***H04R 3/00*** | (2006.01) |

(52) U.S. Cl.
CPC ......... *B60R 16/0231* (2013.01); *H04R 1/025* (2013.01); *H04R 1/026* (2013.01); *H04R 3/00* (2013.01); *H04R 2201/025* (2013.01); *H04R 2499/13* (2013.01)

(58) Field of Classification Search
CPC ........ H04R 2499/13; B60Q 3/80; B60Q 3/70; B60H 3/0014; B60R 16/0231; B60R 11/0217
USPC ............................. 701/49, 419; 381/86, 71.4
See application file for complete search history.

(56) References Cited

U.S. PATENT DOCUMENTS

| | | | | |
|---|---|---|---|---|
| 2003/0052613 | A1* | 3/2003 | Kolpasky | B60R 11/0223 315/77 |
| 2007/0160246 | A1* | 7/2007 | Vollmer | H04R 1/42 381/336 |
| 2015/0078580 | A1* | 3/2015 | Schwerdtfeger | H04R 1/323 381/86 |
| 2016/0068112 | A1* | 3/2016 | Price | H04R 1/02 381/86 |
| 2016/0295308 | A1* | 10/2016 | Battyanyi | H04R 1/26 |
| 2019/0281384 | A1* | 9/2019 | Yang | H04R 1/023 |
| 2021/0343268 | A1* | 11/2021 | Loh | H04R 3/00 |
| 2022/0153214 | A1* | 5/2022 | Tanabe | B60K 35/60 |
| 2022/0229629 | A1* | 7/2022 | Mitsui | H04R 3/00 |

* cited by examiner

ROTARY MULTIFUNCTIONAL SPEAKER AND VEHICLE INCLUDING THE SAME

CROSS-REFERENCE TO RELATED APPLICATION

The present application claims priority to Chinese Patent Application No. 202211673992.5 filed in the Chinese National Intellectual Property Administration on Dec. 26, 2022, the entire contents of which is incorporated herein for all purposes by this reference.

BACKGROUND OF THE PRESENT DISCLOSURE

Field of the Present Disclosure

The present disclosure relates to a vehicle field, and more particularly, to a rotary multifunctional speaker and a vehicle.

Description of Related Art

A speaker is an energy conversion device that converts an electric signal into an acoustic signal, and an application field thereof is very wide. A speaker used in a vehicle is an important component for comfort of the vehicle and is related to a quality of the vehicle and luxury of use.

An existing speaker used in a vehicle is generally used only for reproducing sound, and thus includes a relatively simple function. Therefore, further improvement is required.

For example, according to a related art, a mood light function is added by adding a light emitting diode (LED) lamp bead to a speaker frame. The mood light may change according to rhythm of music. However, because the mood light is covered by a door trim, the effect of the mood light may be insignificant.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a rotary multifunctional speaker and a vehicle including the same. The rotary multifunctional speaker may expand the function of a speaker, and a mood light assembly may emit a light ray before a driver or a passenger alights from the vehicle, generating an alighting ceremony atmosphere.

According to an exemplary embodiment of the present disclosure, a rotary multifunctional speaker includes: a mounting plate: a speaker assembly including a first hemispherical housing and a speaker mounted in the first hemispherical housing: a mood light assembly including a second hemispherical housing and a light source mounted in the second hemispherical housing: and a driving assembly provided on the mounting plate, electrically connected to an in-vehicle computer, and controlled by the in-vehicle computer, in which the speaker is electrically connected to the in-vehicle computer, the light source is electrically connected to the in-vehicle computer, the first and second hemispherical housings form a spherical housing and are mounted on the mounting plate, and the driving assembly coupled to the spherical housing rotates the spherical housing relative to the mounting plate according to control performed by the in-vehicle computer to make one of the mood light assembly and the speaker assembly face the interior of the vehicle.

A first semi-cylindrical housing and a second semi-cylindrical housing may be formed on opposite sides of the first hemispherical housing, respectively, a third semi-cylindrical housing and a fourth semi-cylindrical housing may be formed on opposite sides of the second hemispherical housing, respectively, the first semi-cylindrical housing and the third semi-cylindrical housing may form a hollow first shaft, the second semi-cylindrical housing and the fourth semi-cylindrical housing may form a hollow second shaft, and the first shaft and the second shaft may be positioned on the same straight line to form a rotation axis around which the spherical housing is rotated relative to the mounting plate.

The driving assembly may include a driving member, an output shaft of the driving member, and a first gear portion formed on the output shaft, a second gear portion may be formed on the first shaft, and the first gear portion may mesh with the second gear portion.

A circular opening and two semicircular grooves may be formed in the mounting plate, the spherical housing may be mounted in the circular opening, and the first shaft and the second shaft may be mounted in the corresponding semicircular grooves, respectively.

The speaker may be mounted in the first hemispherical housing by a clamp.

The rotary multifunctional speaker may further include: a circuit board mounted in the second hemispherical housing, including one side on which the light source is mounted, and electrically connected to the speaker, the one side facing the second hemispherical housing: and a controller mounted on the circuit board and controlling an illumination and color change of the light source.

The mood light assembly may further include a condensing structure provided between the circuit board and the second hemispherical housing and surrounding the light source, and a light equalizer provided between the condensing structure and the second hemispherical housing.

The rotary multifunctional speaker may further include a connector fixed to the circuit board and electrically connected to the in-vehicle computer through a conducting wire passing through inside of the second shaft.

A fragrant material box may be provided in the second hemispherical housing, and a solid fragrant material may be loaded into the fragrant material box.

The in-vehicle computer may obtain a vehicle speed, a state of a parking brake, a state of a door lock, and an orientation of the spherical housing, when the first hemispherical housing of the spherical housing faces the interior of the vehicle, the in-vehicle computer may transmit a first command in response to the vehicle speed being 0, the parking brake being at a park position, and the door lock being unlocked, and the first command may be for driving the driving assembly to rotate the second hemispherical housing of the spherical housing to face the interior of the vehicle, and may be for controlling the speaker to stop operation of the speaker and controlling the light source to operate.

The in-vehicle computer may obtain a vehicle speed, a state of a parking brake, a state of a door lock, and an orientation of the spherical housing, when the second hemispherical housing of the spherical housing faces the interior of the vehicle, the in-vehicle computer may transmit a second command in response to the vehicle speed being not 0, the parking brake being not at a park position, or the door lock being locked, and the second command may be for driving the driving assembly to rotate the first hemispherical housing of the spherical housing to face the interior of the vehicle, and may be for controlling the light source to stop operation of the light source and controlling the speaker to operate.

The mounting plate may be fixed to an internal side of a door of the vehicle.

According to another exemplary embodiment of the present disclosure, a vehicle includes the rotary multifunctional speaker according to the exemplary embodiment of the present disclosure.

According to an exemplary embodiment of the present disclosure, the speaker assembly and the mood light assembly may be integrated on opposite sides of the mounting plate, the first hemispherical housing of the speaker assembly and the second hemispherical housing of the mood light assembly may be configured as one spherical housing, and the spherical housing may be rotated relative to the mounting plate by the driving assembly. Accordingly, the function of the speaker may be expanded by making one of the speaker assembly and the mood light assembly face the interior of the vehicle. Furthermore, the mood light assembly may emit a light ray before a driver or a passenger alights from the vehicle, generating an alighting ceremony atmosphere.

The method and apparatus of the present disclosure have other characteristics and advantages, and these characteristics and advantages will be apparent from the accompanying drawings and exemplary embodiments to be described later, or will be described in detail in the accompanying drawings and exemplary embodiments to be described later. Both the drawings and the exemplary embodiments are intended to interpret certain principles of the present disclosure.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
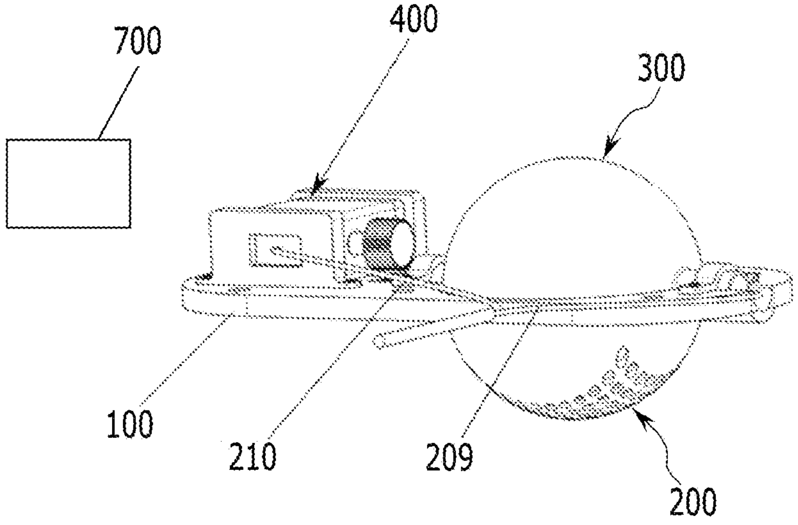
FIG. 1 is a schematic view exemplarily illustrating a structure of a rotary multifunctional speaker according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims Hereinafter, various exemplary embodiments of the present disclosure will be referred to in detail, and the exemplary embodiments will be described later with reference to the drawings. Although the present disclosure is described in combination with the exemplary embodiments of the present disclosure, it is to be understood that the present specification is not intended to limit the present disclosure to the exemplary embodiments of the present disclosure. On the other hand, the present disclosure includes not only the exemplary embodiments of the present disclosure, but also various optional, modified, and equivalent other implementations within the scope defined by the spirit of the present disclosure and the appended claims.

Hereinafter, a rotary multifunctional speaker according to an exemplary embodiment of the present disclosure will be described with reference to FIGS. 1 to 17.

As illustrated in FIGS. 1, 2, 4, and 5, a rotary multifunctional speaker according to the exemplary embodiment of the present disclosure includes a mounting plate 100, a speaker assembly 200, a mood light assembly 300, and a driving assembly 400.

Figure 6:
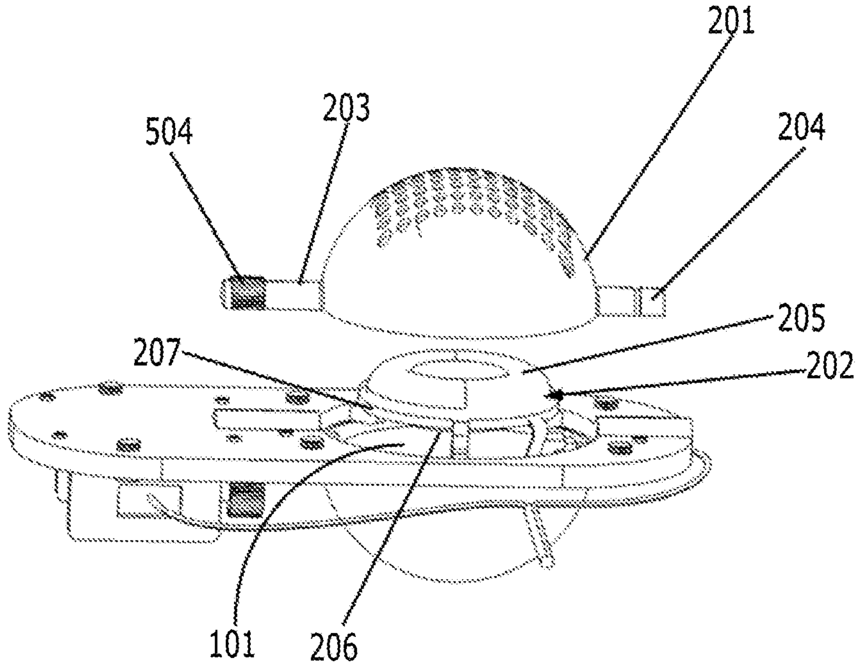
FIG. 6 is a schematic view exemplarily illustrating a rotary multifunctional speaker with a first hemispherical housing separated.

As illustrated in FIG. 6, the speaker assembly 200 includes a first hemispherical housing 201 and a speaker 202 mounted in the first hemispherical housing 201. The speaker 202 is electrically connected to an in-vehicle computer 700. The speaker 202 may be electrically connected to a circuit board 305, and the circuit board 305 may be electrically connected to the in-vehicle computer 700. Therefore, the speaker 202 is electrically connected to the in-vehicle computer 700.

Figure 8:
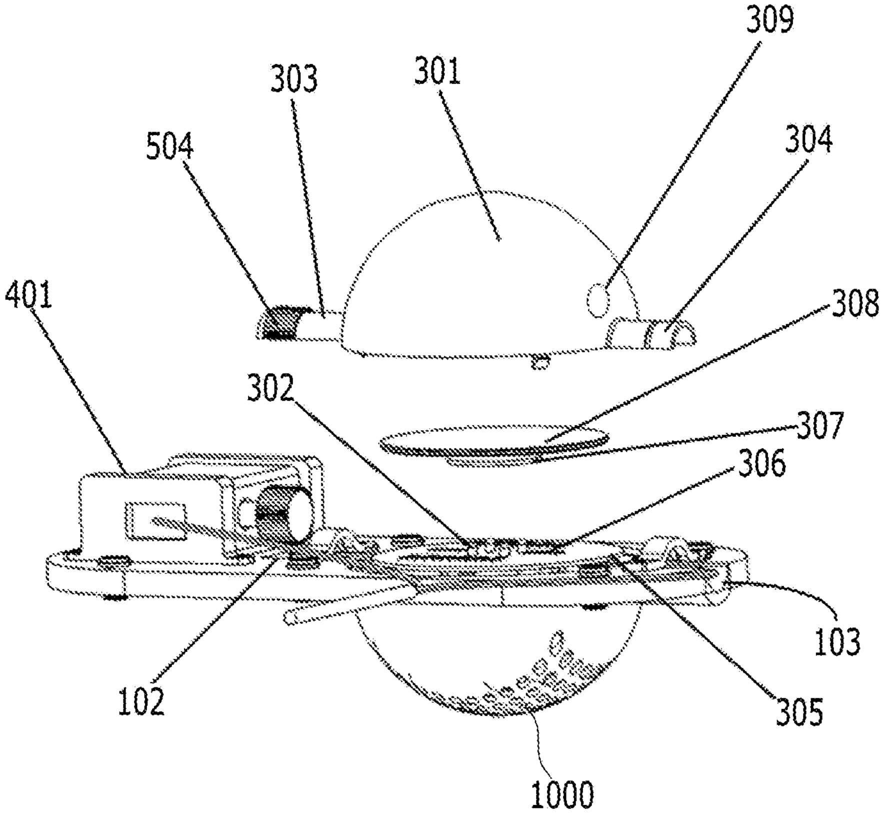
FIG. 8 is a schematic view exemplarily illustrating a rotary multifunctional speaker with a second hemispherical housing separated.
Figure 13:
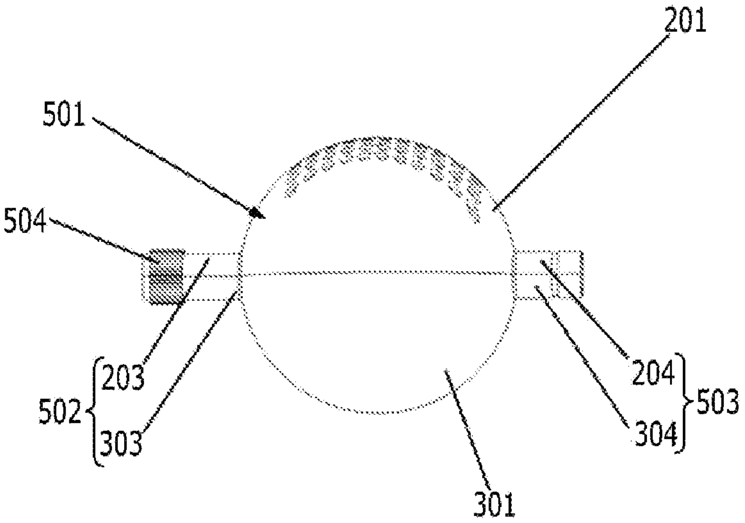
FIG. 13 is a schematic view exemplarily illustrating an assembled spherical housing.

As illustrated in FIG. 8, the mood light assembly 300 includes a second hemispherical housing 301 and a light source 302 mounted in the second hemispherical housing. The light source 302 is electrically connected to the in-vehicle computer 700. Because the light source 302 is provided on the circuit board 305 and electrically connected to the circuit board 305, the light source 302 is electrically connected to the in-vehicle computer 700. As illustrated in FIG. 13, the first hemispherical housing 201 and the second hemispherical housing 301 form a spherical housing 501 and are mounted on the mounting plate 100.

As illustrated in FIG. 1, the driving assembly 400 is provided on the mounting plate 100. The driving assembly 400 is electrically connected to the in-vehicle computer 700 and drives the spherical housing 501 according to control performed by the in-vehicle computer 700 to rotate the spherical housing 501 relative to the mounting plate 100. Accordingly, the driving assembly 400 makes one of the mood light assembly 300 and the speaker assembly 200 face interior of a vehicle.

Figure 16:
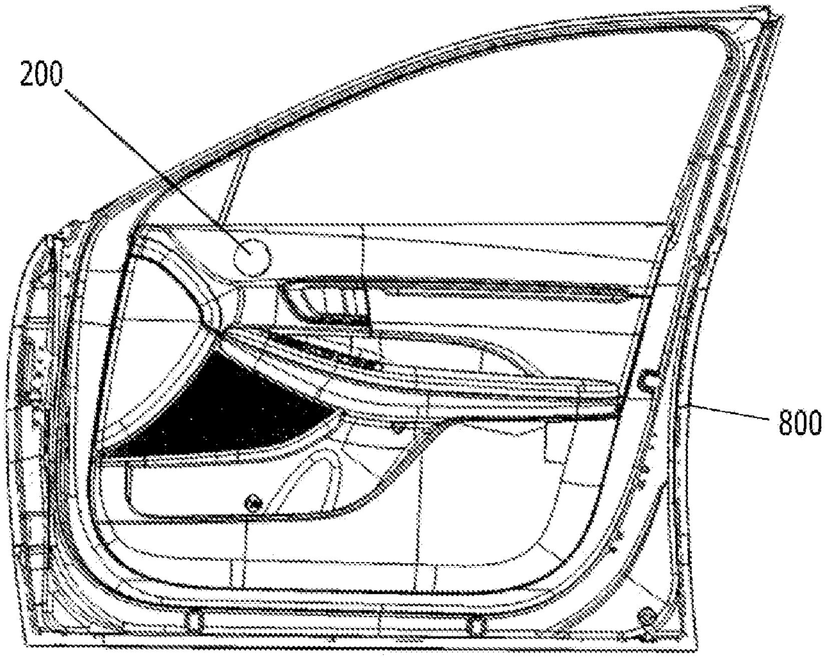
FIG. 16 is a schematic view exemplarily illustrating a state in which a rotary multifunctional speaker according to an exemplary embodiment of the present disclosure is mounted on a vehicle door, wherein a speaker assembly faces interior of a vehicle.

FIG. 16 illustrates a state in which the speaker assembly 200 faces the interior of the vehicle, and a state in which the mood light assembly 300 faces the interior of the vehicle is not illustrated in the drawings.

According to the exemplary embodiment of the present disclosure, the speaker assembly 200 is integrated on one side of the mounting plate 100, and the mood light assembly 300 is integrated on the other side of the mounting plate 100. The first hemispherical housing 201 of the speaker assembly 200 and the second hemispherical housing 301 of the mood light assembly 300 are configured as one spherical housing 501, and the driving assembly 400 rotates the spherical housing 501 relative to the mounting plate 100. Accordingly, one of the speaker assembly 200 and the mood light assembly 300 faces the interior of the vehicle. Therefore, the function of the speaker may be expanded.

Furthermore, the mood light assembly 300 may emit a light ray before a driver or a passenger alights from the vehicle, generating an alighting ceremony atmosphere.

According to the exemplary embodiment of the present disclosure, the mounting plate 100 is mounted on an internal side of a door 800 of the vehicle. Here, a first side of the mounting plate 100 may face the interior of the vehicle, a second side of the mounting plate 100 may be mounted in the door, and the driving assembly 400 may be provided on the second side of the mounting plate 100.

Figure 5:
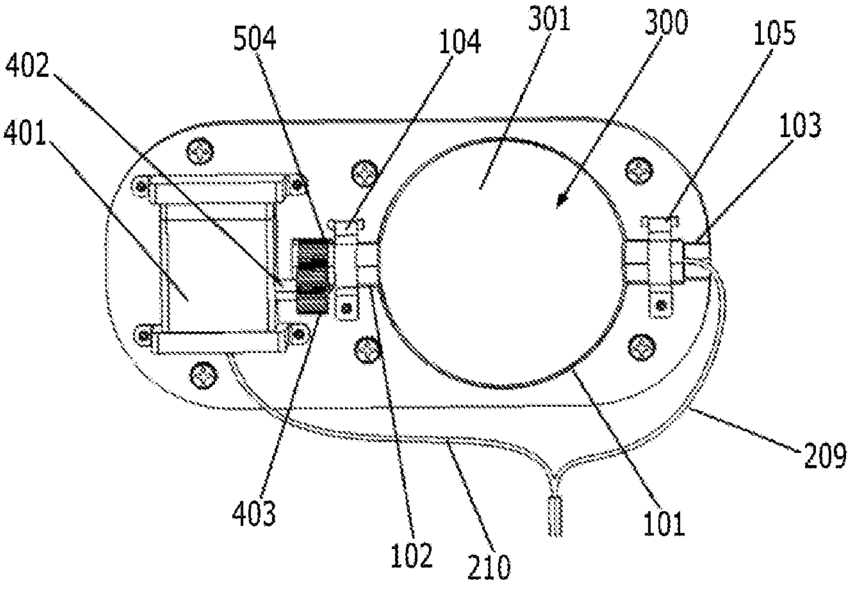
FIG. 5 is a schematic view exemplarily illustrating a second side of a rotary multifunctional speaker.

According to the exemplary embodiment of the present disclosure, as illustrated in FIG. 6, a circular opening 101 is formed in the mounting plate 100. As illustrated in FIGS. 5 and 8, two semicircular grooves 102 and 103 are additionally formed in the mounting plate 100. The semicircular groove 102 and the semicircular groove 103 are positioned on opposite sides of the circular opening 101.

The spherical housing 501 is mounted in the circular opening 101, and a first shaft 502 and a second shaft 503 are mounted in the corresponding semicircular grooves 102 and 103, respectively.

A cross-section of the semicircular groove 102 and a cross-section of the semicircular groove 103 are semicircular, and the semicircular grooves 102 and 103 are recessed from the second side of the mounting plate 100 toward the first side of the mounting plate 100.

The semicircular groove 102 and the semicircular groove 103 each includes a certain length. The semicircular groove 102 and the semicircular groove 103 are positioned on the same axis in a longitudinal direction thereof.

Figure 2:
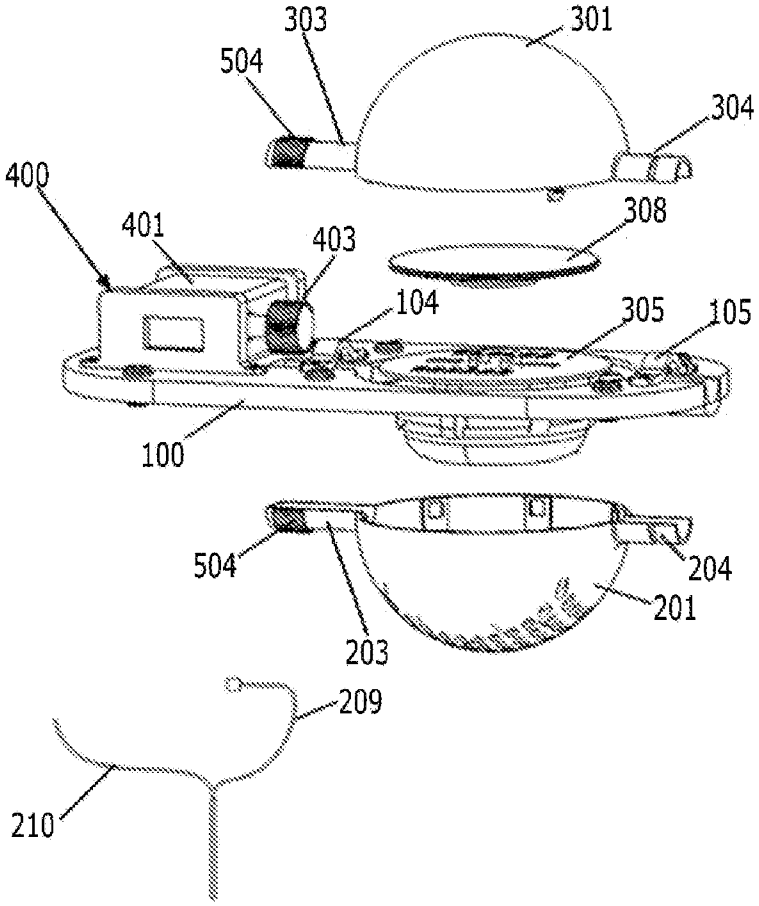
FIG. 2 is an exploded perspective view of the rotary multifunctional speaker of FIG. 1.

According to the exemplary embodiment of the present disclosure, as illustrated in FIGS. 2 and 6, a first semi-cylindrical housing 203 and a second semi-cylindrical housing 204 are respectively provided on opposite sides of the first hemispherical housing 201.

As illustrated in FIGS. 2 and 8, a third semi-cylindrical housing 303 and a fourth semi-cylindrical housing 304 are respectively provided on opposite sides of the second hemispherical housing 301.

As illustrated in FIG. 13, the first semi-cylindrical housing 203 and the third semi-cylindrical housing 303 form the hollow first shaft 502, and the second semi-cylindrical housing 204 and the fourth semi-cylindrical housing 304 form the hollow second shaft 503. The first shaft 502 and the second shaft 503 are positioned on the same straight line to form a rotation axis around which the spherical housing 501 is rotated relative to the mounting plate 100.

The first shaft 502 is mounted in the semicircular groove 102, and the second shaft 503 is mounted in the semicircular groove 103, so that the spherical housing 501 is mounted in the circular opening 101 of the mounting plate 100.

Figure 14:
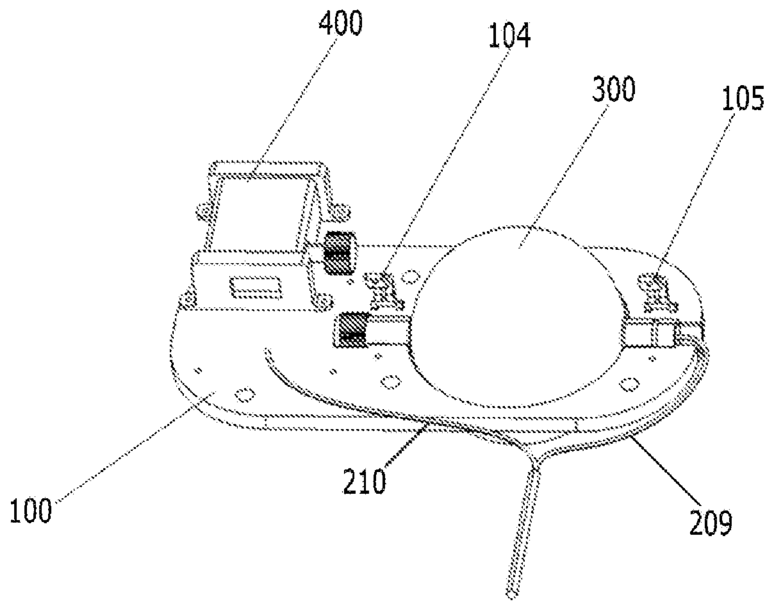
FIG. 14 is a schematic view exemplarily illustrating a spherical housing mounted on a mounting plate.

According to the exemplary embodiment of the present disclosure, as illustrated in FIGS. 2, 5, and 14, an arc clamp 104 corresponding to the semicircular groove 102 and an arc clamp 105 corresponding to the semicircular groove 103 are provided on the second side of the mounting plate 100.

The first shaft 502 is mounted in the semicircular groove 102 by use of the arc clamp 104, and the second shaft 503 is mounted in the semicircular groove 103 by use of the arc clamp 105.

The first shaft 502 is rotatable about its own axis within a position limiting structure formed by the arc clamp 104 and the semicircular groove 102, and the second shaft 503 is rotatable about its own axis within a position limiting structure formed by the arc clamp 105 and the semicircular groove 103. Therefore, the spherical housing 501 is rotatably mounted in the circular opening 101 of the mounting plate 100.

Figure 9:
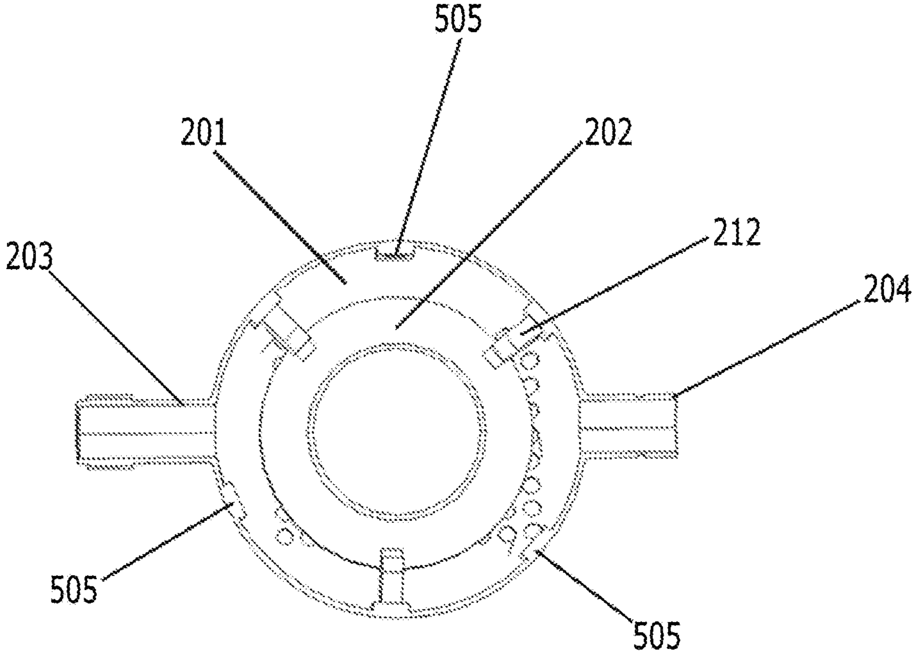
FIG. 9 is a schematic view exemplarily illustrating a speaker mounted within a first hemispherical housing.
Figure 10:
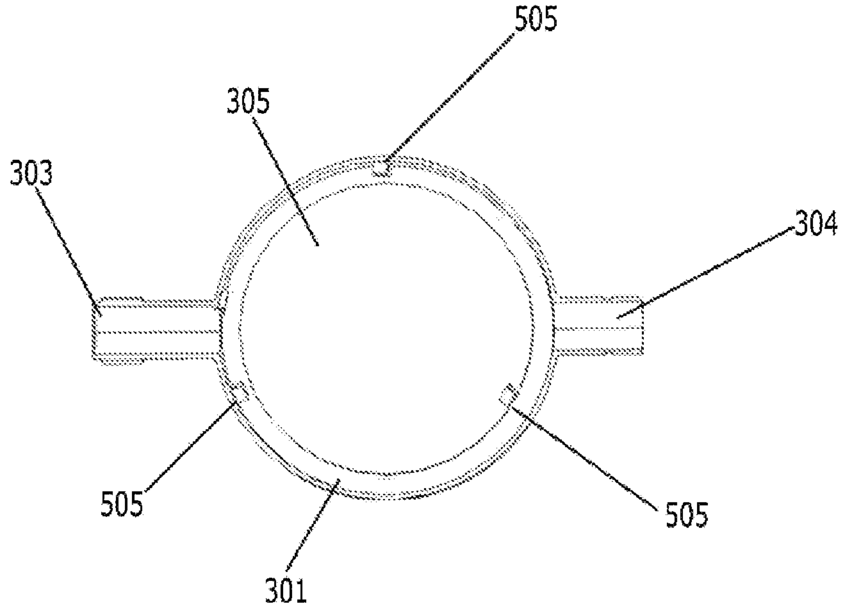
FIG. 10 is a schematic view exemplarily illustrating a circuit board mounted within a first hemispherical housing.

According to the exemplary embodiment of the present disclosure, as illustrated in FIG. 9 and FIG. 10, the first hemispherical housing 201 and the second hemispherical housing 301 are coupled to each other by a hook structure 505 to form the spherical housing 501.

According to an exemplary embodiment of the present disclosure, as illustrated in FIGS. 2 and 5, the driving assembly 400 includes a driving member 401, an output shaft 402 of the driving member, and a first gear portion 403 provided on the output shaft 402.

The driving member 401 is electrically connected to the in-vehicle computer 700 through a conducting wire 210. The in-vehicle computer 700 may be configured to generate a signal for controlling the driving member 401, and the signal is for controlling a rotation direction and a rotation angle of the output shaft 402 of the driving member 401. The signal is transmitted to the driving member 401 through the conducting wire 210 to control the rotation of the spherical housing 501.

Here, the in-vehicle computer 700 may record a state of the driving member 401 based on the signal for controlling the driving member 401 and record an orientation of the spherical housing 501.

A second gear portion 504 is formed on the first shaft 502, and the first gear portion 403 meshes with the second gear portion 504.

The driving member 401 drives the output shaft 402 to be rotated around the output shaft 402 itself, and as the first gear portion 403 and the second gear portion 504 mesh with each other, the output shaft 402 makes the first shaft 502 be rotated around the first shaft 502 itself. Accordingly, the spherical housing 501 may be rotated relative to the mounting plate 100 around the axis on which the first shaft 502 and the second shaft 503 are positioned.

According to the exemplary embodiment of the present disclosure, the driving member 401 may be a motor. Here, a type of driving member 401 is not limited to the motor, and may be any type in the related arts, as long as the above-described function may be implemented.

According to the exemplary embodiment of the present disclosure, as illustrated in FIG. 2, the second gear portion 504 includes a portion positioned on the first semi-cylindrical housing 203 and a portion positioned on the third semi-cylindrical housing 303.

According to the exemplary embodiment of the present disclosure, as illustrated in FIG. 9, the speaker 202 is mounted in the first hemispherical housing 201 by a clamp 212.

According to the exemplary embodiment of the present disclosure, as illustrated in FIG. 8, the rotary multifunctional speaker further includes the circuit board 305 and a controller 306.

Figure 7:
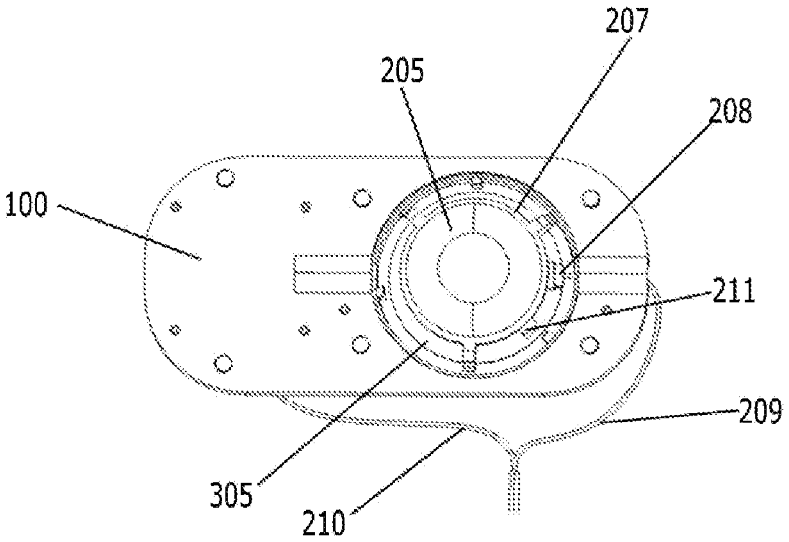
FIG. 7 is a schematic view exemplarily illustrating a first side of a rotary multifunctional speaker with a first hemispherical housing removed.

The circuit board 305 may be mounted in the second hemispherical housing 301, the light source 302 may be mounted on one surface of the circuit board 305 that faces the second hemispherical housing 301, and the circuit board 305 may be electrically connected to the speaker 202. As illustrated in FIG. 7, the circuit board 305 is electrically connected to the speaker 202 through a ribbon harness 211.

The circuit board 305 is electrically connected to the in-vehicle computer 700. As illustrated in FIG. 7, a connector 208 is mounted on the circuit board 305. One end portion of the connector 208 is electrically connected to the in-vehicle computer 700, and the other end portion of the connector 208 is electrically connected to the circuit board 305, so that the connector 208 electrically connects the circuit board 305 to the in-vehicle computer 700. The connector 208 is electrically connected to the in-vehicle computer 700 through a conducting wire 209, and the conducting wire 209 passes through inside of the second shaft 503 and is electrically connected to the in-vehicle computer 700.

The controller 306 is electrically connected to the circuit board 305.

The in-vehicle computer 700 may be configured to generate a signal for controlling the speaker 202 and/or a signal for controlling the light source 302.

Here, the signal for controlling the speaker 202 is transmitted to the speaker 202 by sequentially passing through the conducting wire 209, the circuit board 305, and the ribbon harness 211. The signal for controlling the light source 302 is transmitted to the light source 302 by sequentially passing through the conducting wire 209, the circuit board 305, and the controller 306, and the controller 306 may be configured for controlling an illumination and color change of the light source 302 according to the signal for controlling the light source 302.

According to an exemplary embodiment of the present disclosure, each of the in-vehicle computer 700 and the controller 306 may be a processor (e.g., computer, microprocessor, CPU, ASIC, circuitry, logic circuits, etc.). Each of the in-vehicle computer 700 and the controller 306 may be implemented by a non-transitory memory storing, e.g., a program(s), software instructions reproducing algorithms, etc., which, when executed, controls operations of various components of the vehicle, and a processor configured to execute the program(s), software instructions reproducing algorithms, etc. Alternatively, the in-vehicle computer 700 and the controller 306 may be integrated in a single processor.

According to the exemplary embodiment of the present disclosure, a port corresponding to the ribbon harness 211 is provided in the circuit board 305 so that the ribbon harness 211 is inserted and connected. One end portion of the ribbon harness 211 is welded to the speaker 202, and the other end portion of the ribbon harness 211 is inserted into and connected to the port of the circuit board 305, so that the ribbon harness 211 may electrically connect the speaker 202 to the circuit board 305.

The ribbon harness 211 includes a plurality of connection lines, and the plurality of connection lines are arranged in parallel and mechanically connected to each other.

According to the exemplary embodiment of the present disclosure, as illustrated in FIG. 8, the mood light assembly 300 further includes a condensing structure 307 and a light equalizer 308.

The condensing structure 307 is disposed between the circuit board 305 and the second hemispherical housing 301, and surrounds the light source 302 so that a light ray of the light source 302 converges to the light equalizer 308.

The light equalizer 308 is disposed between the condensing structure 307 and the second hemispherical housing 301, and is configured to uniformly irradiate the second hemispherical housing 301 with the light converged by the condensing structure 307.

The condensing structure 307 and the light equalizer 308 may be integrally formed with each other.

The second hemispherical housing 301 of the mood light assembly 300 may be formed of a transparent material such as transparent plastic, so that the light ray of the light source passes through the second hemispherical housing 301.

According to the exemplary embodiment illustrated in FIG. 2, an external surface of the second hemispherical housing 301 may be a smooth surface.

Figure 3:
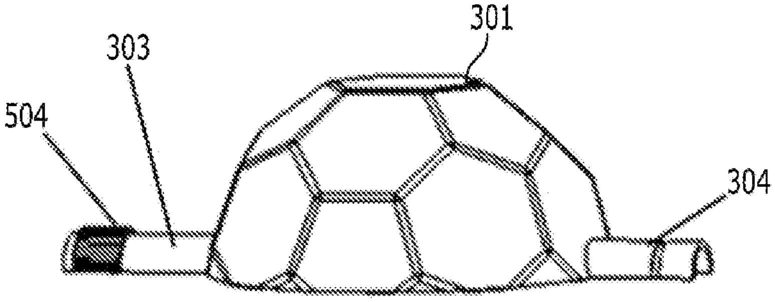
FIG. 3 is a schematic view exemplarily illustrating a structure of a second hemispherical housing according to another exemplary embodiment of the present disclosure.
Figure 4:
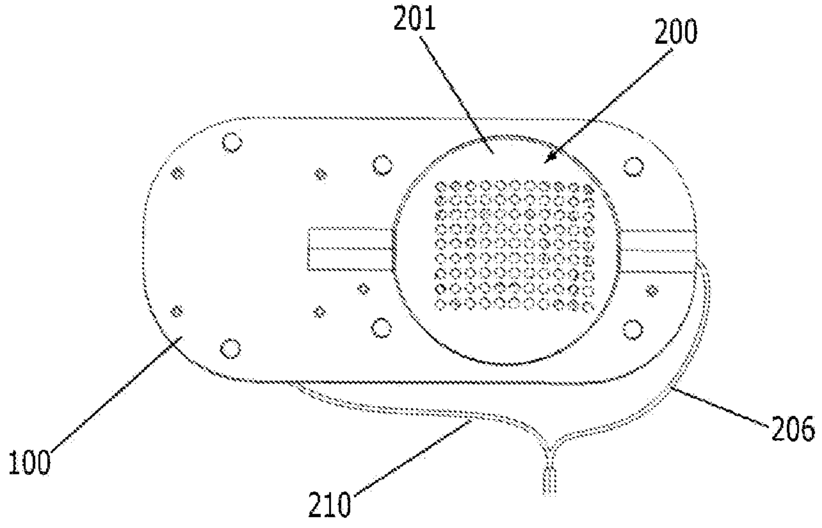
FIG. 4 is a schematic view exemplarily illustrating a first side of a rotary multifunctional speaker.

According to another exemplary embodiment of the present disclosure, as illustrated in FIG. 3, the external surface of the second hemispherical housing 301 may include a prism shape to increase a color changing effect.

As illustrated in FIG. 3, the external surface of the prism is formed by connecting a plurality of hexagonal pieces.

According to various exemplary embodiments of the present disclosure, hollow text may be provided in the second hemispherical housing 301 and may be projected by the light ray of the light source onto a medium configured for receiving the light.

For example, the second hemispherical housing 301 of the above-described rotary multifunctional speaker provided on a right rear door may be provided with hollow text "Be careful of a car coming from behind". After the vehicle stops, the text "Be careful of a car coming from behind" may be projected on a back side of a passenger seat to alert passengers who are about to alight from the vehicle to pay attention to vehicles and pedestrians, preventing occurrence of danger.

According to the exemplary embodiment of the present disclosure, as illustrated in FIG. 8, a fragrant material box 309 is provided in the second hemispherical housing 301, and a solid fragrant material is loaded into the fragrant material box 309.

An openable cover is provided on the fragrant material box 309, and a hopper for putting the solid fragrant material is provided into the fragrant material box 309. A through-hole is formed in the cover, so that fragrance of the solid fragrant material may be introduced into the vehicle through the through-hole of the cover.

The solid fragrant material may be put into the hopper or replaced by opening the cover.

When the mood light assembly 300 faces the interior of the vehicle, the solid fragrant material may increase the fragrance inside the vehicle.

According to the exemplary embodiment of the present disclosure, the first hemispherical housing 201 is formed with lattice holes 1000 through which a sound of the speaker 202 passes.

According to the exemplary embodiment of the present disclosure, as illustrated in FIG. 6, the speaker 202 includes a sounding structure 205, a magnet portion 206, and a bracket 207.

The sounding structure 205 and the magnet portion 206 are mounted in the first hemispherical housing 201 via the bracket 207.

Sounding structures and magnet portions according to the related arts may be used as the sounding structure 205 and the magnet portion 206.

According to the exemplary embodiment of the present disclosure, the sounding structure 205 may include a gasket assembly, a damper, and a dust cap.

According to the exemplary embodiment of the present disclosure, the in-vehicle computer 700 obtains a vehicle speed, a state of a parking brake, a state of a door lock, and the orientation of the spherical housing 501. When the first hemispherical housing 201 of the spherical housing 501 faces the interior of the vehicle, the in-vehicle computer 700 transmits a first command in response to the vehicle speed being 0, the parking brake being at a park position, and the door lock being unlocked. The first command is for driving the driving assembly 400 to rotate the second hemispherical housing 301 of the spherical housing 501 in such a way as to face the interior of the vehicle. The first command is also for controlling the speaker 202 to stop operation and controlling the light source 302 to operate.

According to the exemplary embodiment of the present disclosure, the in-vehicle computer 700 obtains the vehicle speed, the state of the parking brake, the state of the door lock, and the orientation of the spherical housing 501. When the second hemispherical housing 301 of the spherical housing 501 faces the interior of the vehicle, the in-vehicle computer 700 transmits a second command in response to the vehicle speed being not 0, the parking brake being not at the park position, or the door lock being locked. The second command is for driving the driving assembly 400 to rotate the first hemispherical housing 201 of the spherical housing 501 in such a way as to face the interior of the vehicle. The second command is also for controlling the light source 302 to stop operation and controlling the speaker 202 to operate.

Figure 17:
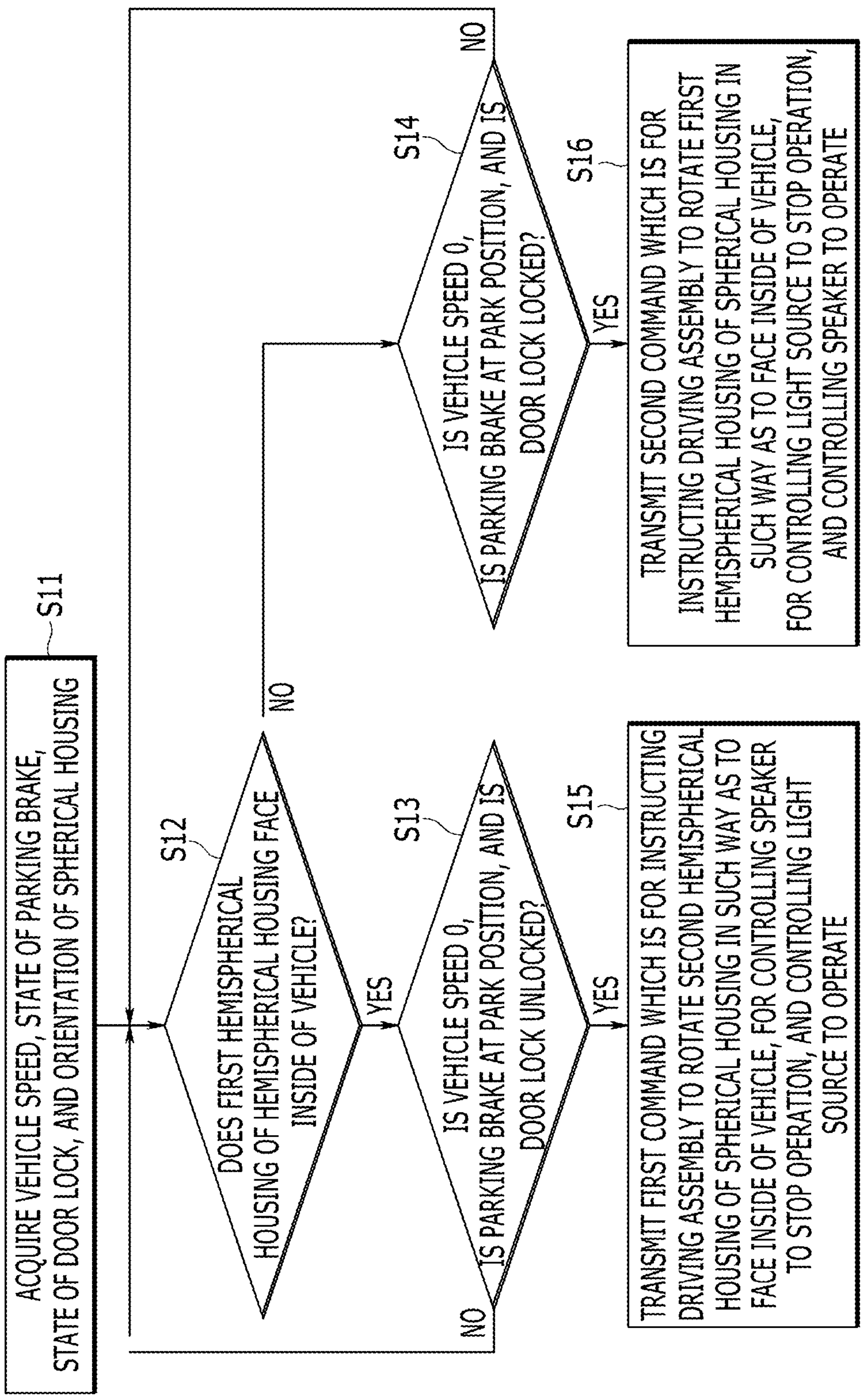
FIG. 17 is a schematic diagram illustrating a flow in which an in-vehicle computer is configured to control rotation of a rotary multifunctional speaker according to an exemplary embodiment of the present disclosure.

FIG. 17 is a schematic diagram illustrating a flow in which the in-vehicle computer controls the rotation of the rotary multifunctional speaker according to the exemplary embodiment of the present disclosure.

In step S11, the in-vehicle computer 700 obtains the orientation of the spherical housing 501.

In step S12, the in-vehicle computer 700 is configured to determine whether or not the first hemispherical housing 201 of the spherical housing 501 faces the interior of the vehicle.

In a case where it is determined in the step S12 that the first hemispherical housing 201 of the spherical housing 501 faces the interior of the vehicle, the in-vehicle computer 700 is configured to determine whether the vehicle speed is 0, whether the parking brake is at the park position, or whether the door lock is unlocked in step S13.

In a case where it is determined in the step S12 that the first hemispherical housing 201 of the spherical housing 501 does not face the interior of the vehicle, that is, in a case where it is determined that the second hemispherical housing 301 of the spherical housing 501 faces the interior of the vehicle, the in-vehicle computer 700 is configured to determine whether the vehicle speed is not 0, whether the parking brake is not at the park position, or whether the door lock is locked in step S14.

In a case where the vehicle speed is 0, the parking brake is at the park position, and the door lock is unlocked in the step S13, the in-vehicle computer 700 transmits the first command in step S15. The first command is for driving the driving assembly 400 to rotate the second hemispherical housing 301 of the spherical housing 501 in such a way as to face the interior of the vehicle. The first command is also for controlling the speaker 202 to stop operation and controlling the light source 302 to operate.

In a case where the vehicle speed is not 0, the parking brake is not at the park position, and the door lock is locked in the step S13, the method returns to the step S12.

In a case where the vehicle speed is not 0, the parking brake is not at the park position, and the door lock is locked in the step S14, the in-vehicle computer 700 transmits the second command in step S16. The second command is for driving the driving assembly 400 to rotate the first hemispherical housing 201 of the spherical housing 501 in such a way as to face the interior of the vehicle. The second command is also for controlling the light source 302 to stop operation and controlling the speaker 202 to operate.

In a case where the vehicle speed is 0, the parking brake is at the park position, and the door lock is unlocked in the step S14, the method returns to the step S12.

According to the exemplary embodiment of the present disclosure, a display is further provided in the in-vehicle computer 700 of the vehicle, and the display may provide a first human-machine interface window 601 and a second human-machine interface window 602.

Figure 15:
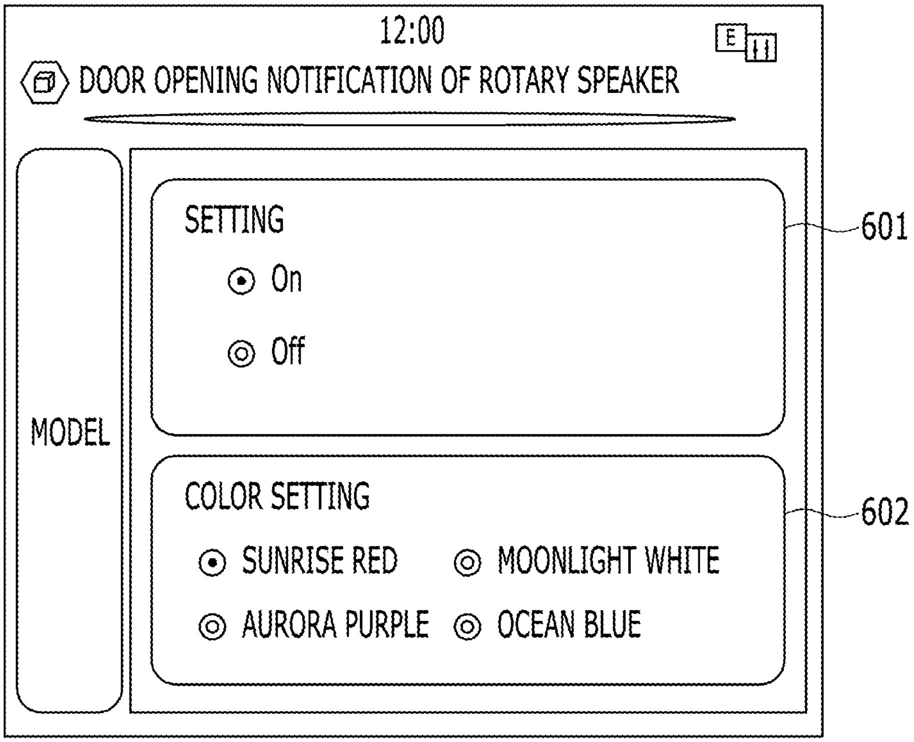
FIG. 15 is a schematic view exemplarily illustrating a human-machine interface window provided by an exemplary embodiment of the present disclosure.

As illustrated in FIG. 15, a user may select ON or OFF of a rotation function of the rotary multifunctional speaker through the first human-machine interface window 601.

The user may select an illumination color of the mood light through the second human-machine interface window 602.

The exemplary embodiment of the present disclosure further provides the vehicle on which the rotary multifunctional speaker is mounted.

The rotary multifunctional speaker may be mounted on each of two front doors and two rear doors of the vehicle.

Before the driver or the passenger alights from the vehicle, the rotary multifunctional speaker mounted on the front door 800 may be configured to generate the alighting ceremony atmosphere by use of the illumination of the mood light assembly 300.

Furthermore, before the passenger in the backseat alights from the vehicle, the rotary multifunctional speaker mounted on the rear door 800 projects the text such as "Be careful of a car coming from behind" on the back side of the front seat by use of the mood light assembly 300, so that the passenger who is about to alight from the vehicle may be reminded to pay attention to the vehicles and the pedestrians. Therefore, it is possible to prevent the occurrence of danger.

The rotary multifunctional speakers on the four doors 800 may be operated independently of each other.

The assembly and installation processes of the rotary multifunctional speaker are as follows.

Figure 11:
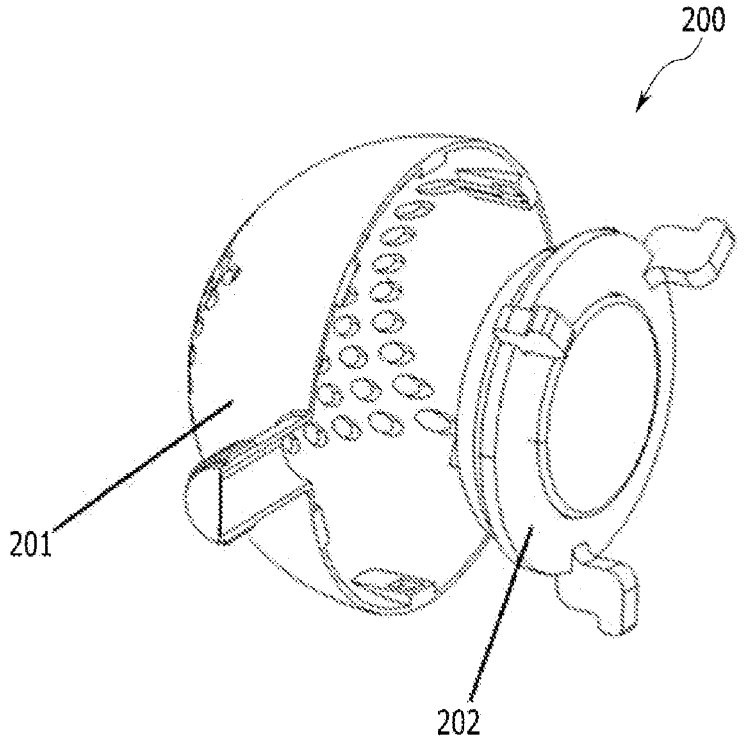
FIG. 11 is a schematic assembly view of a speaker assembly.

As illustrated in FIG. 11, the speaker assembly 200 is obtained by mounting the speaker 202 in the first hemispherical housing 201.

Figure 12:
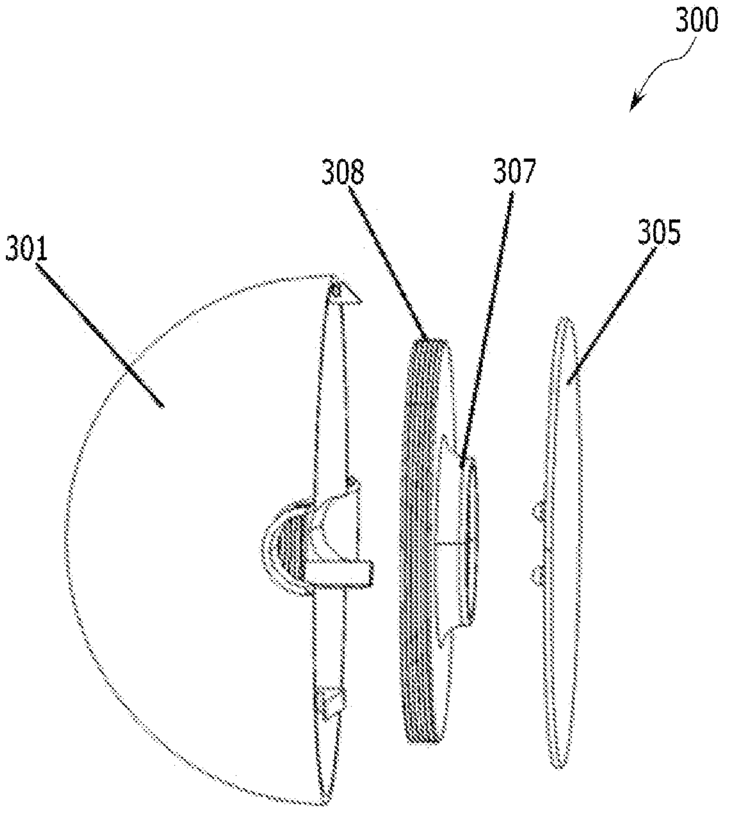
FIG. 12 is a schematic assembly view of a mood light assembly.

As illustrated in FIG. 12, the mood light assembly 300 is obtained by mounting the circuit board 305, the condensing structure 307, and the light equalizer 308 in the second hemispherical housing 301.

The conducting wire 209 connected to the connector 208 passes through the fourth semi-cylindrical housing 304 of the second hemispherical housing 301, and the speaker assembly 200 and the mood light assembly 300 are coupled to each other. Accordingly, the conducting wire 209 passes through the second shaft 503.

The other end portion of the ribbon harness 211 of the speaker 202 is inserted into and connected to the port of the circuit board 305 to electrically connect the speaker 202 to the circuit board 305.

As illustrated in FIG. 13, the speaker assembly 200 and the mood light assembly 300 are coupled to each other.

As illustrated in FIG. 14, the speaker assembly 200 and the mood lamp assembly 300 coupled to each other are mounted on the mounting plate 100. Furthermore, the driving assembly 400 is mounted on the mounting plate 100, and the first gear portion 403 on the output shaft 402 of the driving assembly 401 and the second gear portion 504 of the first shaft 502 of the spherical housing 501 mesh with each other.

The conducting wire 209 passing through the second shaft 503 and the conducting wire 210 of the driving assembly 400 are electrically connected to the in-vehicle computer 700.

Finally, the rotary multifunctional speaker is mounted on the internal side of the door 800 of the vehicle.

Hereinafter, the operation of the rotary multifunctional speaker according to the exemplary embodiment of the present disclosure will be described with reference to the drawing.

As illustrated in FIG. 15, the user turns on the rotation function on the display and selects the color of the mood light.

While driving of the vehicle, one side of the speaker assembly 200 of the rotary multifunctional speaker faces the interior of the vehicle, and the speaker assembly 200 may reproduce sound normally. At the instant time, the mood light assembly 300 does not operate, that is, the light source 302 of the mood light assembly 300 does not emit the light.

When the vehicle speed is 0, the brake is at the park position, and the door lock is unlocked (that is, before the driver or the passenger alights from the vehicle), the in-vehicle computer 700 is configured to control the driving assembly 400 to rotate the spherical housing 501 so that the mood light assembly 300 faces the interior of the vehicle. Furthermore, the mood light assembly 300 generates the corresponding light ray, and at the instant time, the speaker 202 of the speaker assembly 200 does not operate.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as “unit”, “module”, etc. included in the specification mean units for processing at least one function or operation, which may be implemented by hardware, software, or a combination thereof.

For convenience in explanation and accurate definition in the appended claims, the terms “upper”, “lower”, “inner”, “outer”, “up”, “down”, “upwards”, “downwards”, “front”, “rear”, “back”, “inside”, “outside”, “inwardly”, “outwardly”, “interior”, “exterior”, “internal”, “external”, “forwards”, and “backwards” are used to describe features of the exemplary embodiments with reference to the positions of such features as displayed in the figures. It will be further understood that the term “connect” or its derivatives refer both to direct and indirect connection.

The term “and/or” may include a combination of a plurality of related listed items or any of a plurality of related listed items. For example, “A and/or B” includes all three cases such as “A”, “B”, and “A and B”.

In the present specification, unless stated otherwise, a singular expression includes a plural expression unless the context clearly indicates otherwise.

In exemplary embodiments of the present disclosure, “at least one of A and B” may refer to “at least one of A or B” or “at least one of combinations of at least one of A and B”. Furthermore, “one or more of A and B” may refer to “one or more of A or B” or “one or more of combinations of one or more of A and B”.

In the exemplary embodiment of the present disclosure, it should be understood that a term such as “include” or “have” is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A rotary multifunctional speaker apparatus comprising:

a mounting plate;

a speaker assembly including a first hemispherical housing and a speaker mounted in the first hemispherical housing;

a mood light assembly including a second hemispherical housing and a light source mounted in the second hemispherical housing; and a driving assembly provided on the mounting plate, electrically connected to an in-vehicle computer, and controlled by the in-vehicle computer, wherein the speaker is electrically connected to the in-vehicle computer and the light source is electrically connected to the in-vehicle computer, wherein the first and second hemispherical housings form a spherical housing and are mounted on the mounting plate, and wherein the driving assembly coupled to the spherical housing rotates the spherical housing relative to the mounting plate according to control performed by the in-vehicle computer to switch positions of the mood light assembly and the speaker assembly to each other such that only one of the mood light assembly and the speaker assembly faces an interior of a vehicle.

2. The rotary multifunctional speaker apparatus of claim 1, wherein a first semi-cylindrical housing and a second semi-cylindrical housing are connected to opposite sides of the first hemispherical housing, respectively, wherein a third semi-cylindrical housing and a fourth semi-cylindrical housing are connected to opposite sides of the second hemispherical housing, respectively, wherein the first semi-cylindrical housing and the third semi-cylindrical housing form a hollow first shaft, and the second semi-cylindrical housing and the fourth semi-cylindrical housing form a hollow second shaft, and wherein the first shaft and the second shaft are positioned on a same straight line to form a rotation axis around which the spherical housing is rotated relative to the mounting plate.

3. The rotary multifunctional speaker apparatus of claim 2, wherein the driving assembly includes a driving member, an output shaft of the driving member, and a first gear portion formed on the output shaft, wherein a second gear portion is formed on the first shaft, and wherein the first gear portion meshes with the second gear portion.

4. The rotary multifunctional speaker apparatus of claim 2, wherein a circular opening and first and second semicircular grooves are formed in the mounting plate, wherein the spherical housing is mounted in the circular opening, and wherein the first shaft and the second shaft are mounted in the corresponding first and second semicircular grooves, respectively.

5. The rotary multifunctional speaker apparatus of claim 1, wherein the speaker is mounted in the first hemispherical housing by a clamp.

6. The rotary multifunctional speaker apparatus of claim 2, further including:

a circuit board mounted in the second hemispherical housing, including one side on which the light source is mounted, and electrically connected to the speaker, the one side facing the second hemispherical housing; and a controller mounted on the circuit board and electrically connected to the light source and configured for controlling an illumination and color change of the light source.

7. The rotary multifunctional speaker apparatus of claim 5, wherein the mood light assembly further includes:

a condensing structure provided between the circuit board and the second hemispherical housing and surrounding the light source radiating a light, and a light equalizer provided between the condensing structure and the second hemispherical housing to uniformly irradiate the second hemispherical housing with the light converged by the condensing structure.

8. The rotary multifunctional speaker apparatus of claim 5, further including a connector fixed to the circuit board and electrically connected to the controller through a conducting wire passing through inside of the second shaft.

9. The rotary multifunctional speaker apparatus of claim 1, wherein a fragrant material box is provided in the second hemispherical housing, and a solid fragrant material is loaded into the fragrant material box.

10. The rotary multifunctional speaker apparatus of claim 1, wherein the first hemispherical housing is formed with lattice holes through which a sound of the speaker passes.

11. The rotary multifunctional speaker apparatus of claim 1, wherein the second hemispherical housing includes a hollow text to be projected by a light ray of the light source.

12. The rotary multifunctional speaker apparatus of claim 1, wherein the in-vehicle computer is configured to obtain a vehicle speed, a state of a parking brake, a state of a door lock, and an orientation of the spherical housing, wherein when the first hemispherical housing of the spherical housing faces the interior of the vehicle, the in-vehicle computer is configured to transmit a first command in response to the vehicle speed being 0, the parking brake being at a park position, and the door lock being unlocked, and wherein the first command is for driving the driving assembly to rotate the second hemispherical housing of the spherical housing to face the interior of the vehicle, and is for controlling the speaker to stop operation of the speaker and controlling the light source to operate.

13. The rotary multifunctional speaker apparatus of claim 1, wherein the in-vehicle computer is configured to obtain a vehicle speed, a state of a parking brake, a state of a door lock, and an orientation of the spherical housing, wherein when the second hemispherical housing of the spherical housing faces the interior of the vehicle, the in-vehicle computer is configured to transmit a second command in response to the vehicle speed being not 0, the parking brake being not at a park position, or the door lock being locked, and wherein the second command is for driving the driving assembly to rotate the first hemispherical housing of the spherical housing to face the interior of the vehicle, and is for controlling the light source to stop operation of the light source and controlling the speaker to operate.

14. The rotary multifunctional speaker apparatus of claim 1, wherein the mounting plate is fixed to an internal side of a door of the vehicle.

15. A vehicle including the rotary multifunctional speaker apparatus of claim 1.

16. A method of controlling a rotary multifunctional speaker apparatus including a mounting plate, a speaker assembly including a first hemispherical housing and a speaker mounted in the first hemispherical housing, a mood light assembly including a second hemispherical housing and a light source mounted in the second hemispherical housing, a driving assembly provided on the mounting plate, coupled to a spherical housing and electrically connected to a controller, wherein the first hemispherical housing and the second hemispherical housing form the spherical housing, the method comprising:

obtaining, by the controller, a vehicle speed, a state of a parking brake, a state of a door lock, and an orientation of the spherical housing; and selectively rotating the spherical housing, based on at least one of the vehicle speed, the state of the parking brake, the state of the door lock, and the orientation of the spherical housing to switch positions of the mood light assembly and the speaker assembly to each other such that only one of the mood light assembly and the speaker assembly faces an interior of a vehicle.

17. The method of claim 16, in response that the first hemispherical housing of the spherical housing faces the interior of the vehicle, the vehicle speed is 0, the parking brake is at a park position, and the door lock is unlocked, controlling, by the controller, the driving assembly to rotate the second hemispherical housing of the spherical housing to face the interior of the vehicle; and controlling, by the controller, the speaker to stop operation of the speaker and controlling, by the controller, the light source to operate.

18. The method of claim 16, in response that the second hemispherical housing of the spherical housing faces the interior of the vehicle, the vehicle speed is not 0, the parking brake is not at a park position, or the door lock is locked, controlling, by the controller, the driving assembly to rotate the first hemispherical housing of the spherical housing to face the interior of the vehicle; and controlling, by the controller, the light source to stop operation of the light source and controlling, by the controller, the speaker to operate.

* * * * *